United States Patent
Godana et al.

(10) Patent No.: US 10,264,605 B2
(45) Date of Patent: Apr. 16, 2019

(54) LISTEN-BEFORE-TALK BASED MEDIUM ACCESS

(71) Applicant: Telefonaktiebolaget LM Ericsson (publ), Stockholm (SE)

(72) Inventors: Bruhtesfa Godana, Stavanger (NO); Laetitia Falconetti, Solna (SE); Anders Furuskär, Stockholm (SE); Chrysostomos Koutsimanis, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 76 days.

(21) Appl. No.: 15/329,108

(22) PCT Filed: Jul. 29, 2014

(86) PCT No.: PCT/SE2014/050910
§ 371 (c)(1),
(2) Date: Jan. 25, 2017

(87) PCT Pub. No.: WO2016/018182
PCT Pub. Date: Feb. 4, 2016

(65) Prior Publication Data
US 2017/0231003 A1    Aug. 10, 2017

(51) Int. Cl.
*H04W 74/08* (2009.01)
(52) U.S. Cl.
CPC ............... *H04W 74/0808* (2013.01)
(58) Field of Classification Search
CPC .................................................. H04W 74/0808
(Continued)

(56) References Cited

U.S. PATENT DOCUMENTS

2009/0067448 A1   3/2009   Stanwood et al.
2011/0128895 A1   6/2011   Sadek et al.
(Continued)

FOREIGN PATENT DOCUMENTS

EP      2757850 A1    7/2014

OTHER PUBLICATIONS

Beluri, Mihaela et al., "Mechanisms for LTE Coexistence in TV White Space", 2012 IEEE International Symposium on Dynamic Spectrum Access Networks (DYSPAN), Oct. 16-19, 2012, 317-326.
(Continued)

*Primary Examiner* — Obaidul Huq
(74) *Attorney, Agent, or Firm* — Patent Portfolio Builders, PLLC

(57) ABSTRACT

There is provided a method, performed by a communication station, for Listen-Before-Talk, LBT, based medium access. The method comprises the step (S1) of performing an LBT-based medium access procedure including sensing a radio-based medium on a shared radio spectrum during a sensing duration, deferring transmission if an on-going transmission is detected during the sensing, and transmitting on the radio-based medium if no on-going transmission is detected during the sensing. The method further comprises the step (S2) of waiting, when the communication station has transmitted, for a waiting duration that is based on a time duration between consecutive sensing occasions for at least one other communication station, also operating according to an LBT-based medium access procedure on the shared radio spectrum, before performing the LBT-based medium access procedure again.

9 Claims, 10 Drawing Sheets

(58) Field of Classification Search
USPC .................................. 370/310, 328, 329
See application file for complete search history.

(56) References Cited

U.S. PATENT DOCUMENTS

| | | | |
|---|---|---|---|
| 2015/0099525 A1* | 4/2015 | Ji ......................... | H04W 72/04 455/450 |
| 2015/0110012 A1* | 4/2015 | Bhushan ........... | H04W 74/0816 370/329 |
| 2017/0034851 A1* | 2/2017 | Kwon ............... | H04W 74/0808 |

OTHER PUBLICATIONS

Ratasuk, Rapeepat et al., "License-Exempt LTE Deployment in Heterogeneous Network", 2012 International Symposium on Wireless Communication Systems (ISWCS), Aug. 28-31, 2012, 246-250.
Unknown, Author, "Broadband Radio Access Networks (BRAN); 5 GHz high performance RLAN; Harmonized EN covering the essential requirements of article 3.2 of the R&TTE Directive", ETSI EN 301 893 V1.7.0, Jan. 2012, 1-90.

\* cited by examiner

LISTEN-BEFORE-TALK BASED MEDIUM ACCESS

TECHNICAL FIELD

The proposed technology generally relates to a method, performed by a communication station, for Listen-Before-Talk, LBT, based medium access, a communication station configured for LBT based medium access, and a corresponding computer program and computer program carrier.

BACKGROUND

In general, medium access is of outmost importance for the operation and performance of communication networks.

One of the known Medium Access Control, MAC, protocols is called Listen-Before-Talk, LBT. This is a medium access mechanism in which a communication station senses a radio-based medium during a listening duration and defers transmission if it detects an on-going transmission and transmits more or less immediately if no on-going transmission is detected. In other words, the station verifies the absence of traffic before transmitting on the shared medium.

However, it has been recognized that conventional LBT-based medium access suffers from various problems, e.g. relating to unbalanced and/or unfair medium or channel sharing between different communication stations.

This has limited the use of conventional LBT-based medium access in several communication applications.

SUMMARY

It is a general object to provide an improved radio medium access scheme.

It is an object to provide an improved method, performed by a communication station, for Listen-Before-Talk, LBT, based medium access.

It is also an object to provide a communication station configured for LBT based medium access.

Yet another object is to provide a corresponding computer program and computer program carrier.

At least one of these and other objects is met by at least one embodiment of the proposed technology.

According to a first aspect, there is provided a method, performed by a communication station, for Listen-Before-Talk, LBT, based medium access.

The method comprises the step of performing an LBT-based medium access procedure including:
sensing a radio-based medium on a shared radio spectrum during a sensing duration;
deferring transmission if an on-going transmission is detected during the sensing; and
transmitting on the radio-based medium if no on-going transmission is detected during the sensing.

The method further comprises the step of waiting, when the communication station has transmitted, for a waiting duration that is based on a time duration between consecutive sensing occasions for at least one other communication station, also operating according to an LBT-based medium access procedure on the shared radio spectrum, before performing the LBT-based medium access procedure again.

In this way, the other communication station(s) are also allowed/ensured access to the radio-based medium on the shared radio spectrum, or at least the chances to access the medium are greatly improved, when performing a corresponding LBT-based medium access procedure.

By way of example, this enables a more balanced and/or fair medium or channel sharing between different communication stations, belonging to the same or different networks.

According to a second aspect, there is provided a communication station configured for Listen-Before-Talk, LBT, based medium access.

The communication station is configured to perform an LBT-based medium access procedure including:
sensing a radio-based medium on a shared radio spectrum during a sensing duration;
deferring transmission if an on-going transmission is detected during the sensing; and
transmitting on the radio-based medium if no on-going transmission is detected during the sensing.

The communication station is also configured to wait, when the communication station has transmitted, for a waiting duration that is based on a time duration between consecutive sensing occasions for at least one other communication station, also operating according to an LBT-based medium access procedure on the shared radio spectrum, before performing the LBT-based medium access procedure again.

According to a third aspect, there is provided a computer program comprising instructions, which when executed by at least one processor, cause the at least one processor to:
control a Listen-Before-Talk, LBT, based medium access procedure in which a radio-based medium is sensed on a shared radio spectrum during a sensing duration and a transmit opportunity on the radio-based medium is given to a communication station if no on-going transmission is detected during the sensing; and
enable the communication station to wait, when the communication station has transmitted in the given transmit opportunity, for a waiting duration that is based on a time duration between consecutive sensing occasions for at least one other communication station, also operating according to an LBT-based medium access procedure on the shared radio spectrum, before performing the LBT-based medium access procedure again.

According to a fourth aspect, there is provided a carrier comprising the computer program according to the third aspect.

According to a fifth aspect, there is provided a communication station for performing Listen-Before-Talk, LBT, based medium access. The communication station comprises:
a controlling module for controlling an LBT-based medium access procedure in which a radio-based medium is sensed on a shared radio spectrum during a sensing duration and a transmit opportunity on the radio-based medium is given to a communication station if no on-going transmission is detected during said sensing; and
a waiting module for enabling the communication station to wait, when the communication station has transmitted in the given transmit opportunity, for a waiting duration that is based on a time duration between consecutive sensing occasions for at least one other communication station, also operating according to an LBT-based medium access procedure on the shared radio spectrum, before performing the LBT-based medium access procedure again.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
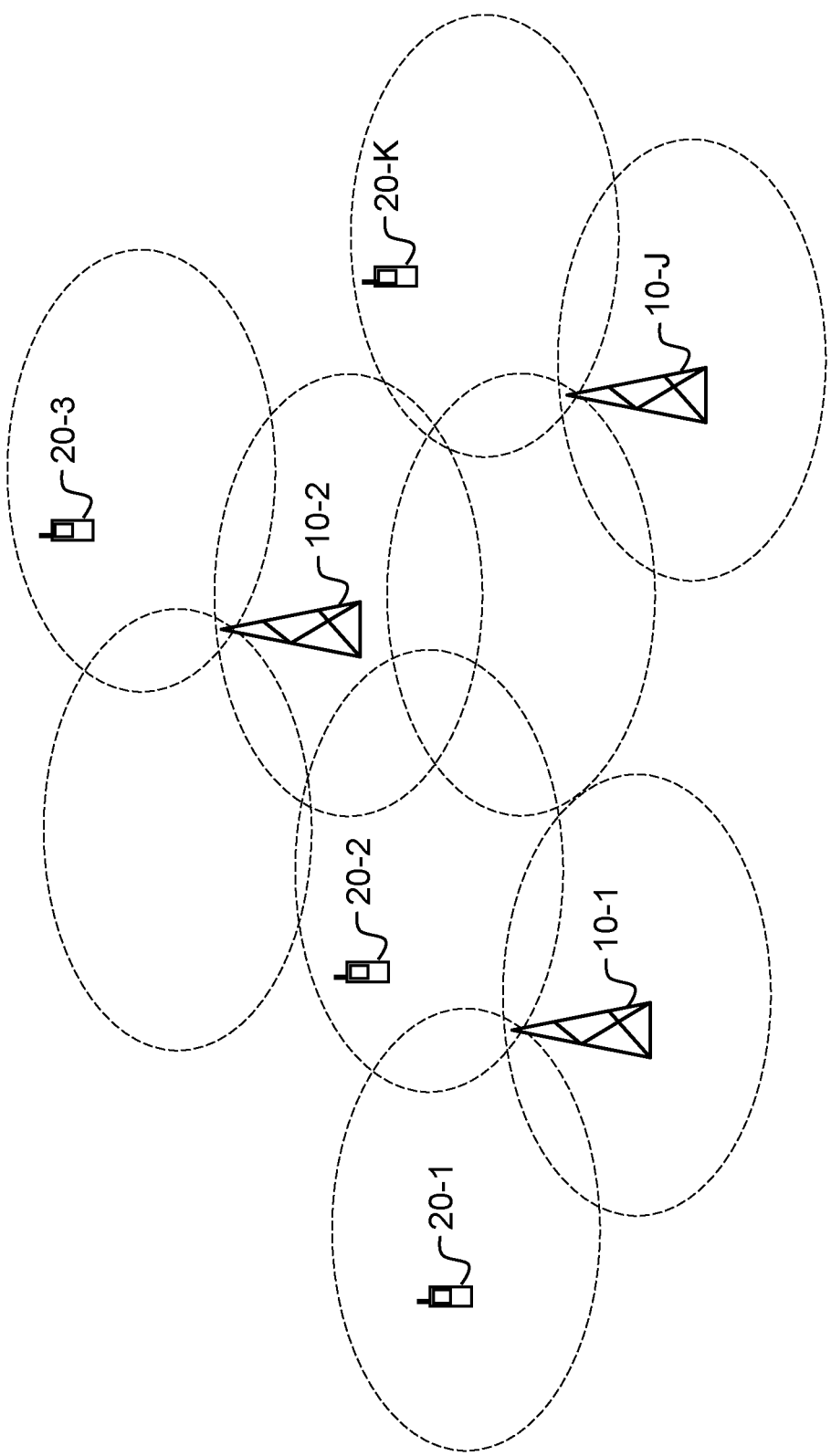
FIG. 1 is a schematic diagram illustrating an example of a communication system.

For a better understanding of the proposed technology, it may be useful to begin with a brief overview of a schematic example of a communication system, with reference to FIG. 1. In this particular example, the communication system includes a number of communication stations, including radio base stations and/or mobile stations. By way of example, there may be a number J of radio base stations 10-1, ..., 10-J serving a number K of mobile stations 20-1, ..., 20-K.

As used herein, the non-limiting term "radio base station" may refer to different types of base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

As used herein, the non-limiting terms "mobile station", "User Equipment" or "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "mobile station" should be interpreted as a non-limiting term comprising any type of wireless device communicating with a radio network node in a cellular or mobile communication system or any device equipped with radio circuitry for wireless communication according to any relevant standard for communication within a cellular or mobile communication system.

As previously indicated, there is a general need for an improved radio medium access scheme. In particular, it has been recognized that conventional LBT-based medium access suffers from various problems, e.g. relating to unbalanced and/or unfair medium or channel sharing between different communication stations. It is therefore desirable to provide improved LBT-based medium access.

Figure 2:
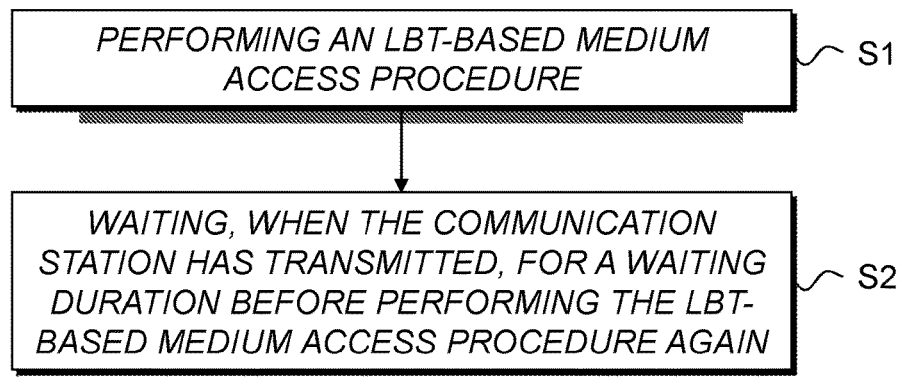
FIG. 2 is a schematic flow diagram illustrating an example of a method for LBT based medium access according to an embodiment.

FIG. 2 is a schematic flow diagram illustrating an example of a method for LBT based medium access according to an embodiment. The method is performed by a communication station.

The method comprises the step S1 of performing an LBT-based medium access procedure including:
  sensing a radio-based medium on a shared radio spectrum during a sensing duration;
  deferring transmission if an on-going transmission is detected during the sensing; and
  transmitting on the radio-based medium if no on-going transmission is detected during the sensing.

The method further comprises the step S2 of waiting, when the communication station has transmitted, for a waiting duration that is based on a time duration between consecutive sensing occasions for at least one other communication station, also operating according to an LBT-based medium access procedure on the shared radio spectrum, before performing the LBT-based medium access procedure again.

In this way, the other communication station(s) are also allowed/ensured access to the radio-based medium on the shared radio spectrum, or at least the chances to access the medium are greatly improved, when performing a corresponding LBT-based medium access procedure.

By way of example, this enables a more balanced and/or fair medium or channel sharing between different communication stations, belonging to the same or different networks.

Alternatively, the waiting step can be expressed as: repeating, when the communication station has transmitted, the LBT-based medium access procedure after expiry of a waiting duration that is based on a time duration between consecutive sensing occasions for at least one other communication station, also operating according to an LBT-based medium access procedure on the shared radio spectrum.

In other words, when the communication station has had a transmit opportunity and transmitted data on the radio-based medium, the LBT-based medium access procedure is repeated or performed again only after the waiting duration has expired.

In a sense, the proposed LBT-based medium access can be seen as an adaptive LBT-based medium access protocol since the waiting duration is dependent on a time duration between consecutive sensing occasions for at least one other communication station.

Sometimes, the Listen-Before-Talk, LBT, procedure is referred to as Sense-Before-Transmit.

By way of example, the channel sensing, or more generally the sensing of the radio-based medium, may be performed by estimating a received signal level, and the determination of whether or not there is an on-going transmission can be done, e.g. by comparing the received signal level to a threshold level. If the received signal level is below the threshold level, the medium is considered to be free and accessible. If the received signal level exceeds the threshold level, the medium is considered to be occupied by an on-going transmission. The threshold level can for example be a so-called Clear Channel Assessment, CCA, threshold.

Figure 3:
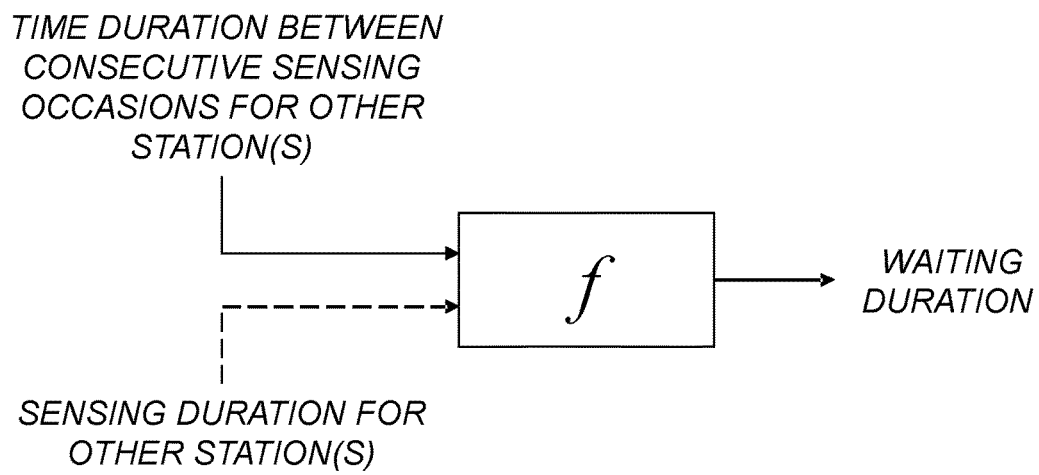
FIG. 3 is a schematic diagram illustrating an example of how to determine a waiting duration according to an embodiment.

As illustrated in FIG. 3, the waiting duration may for example be determined as a function $f$ of the time duration between consecutive sensing occasions for one or more other stations. Optionally, the sensing duration used by the other station(s) may be provided as additional input to the function $f$ when determining the waiting duration.

In an example embodiment, the time duration between consecutive sensing occasions corresponds to a sensing periodicity of the at least one other communication station, and the waiting duration is based on the sensing periodicity and sensing duration of the at least one other communication station.

As an example, the waiting duration, denoted $T_W$, may be equal to or greater than the sum of the sensing periodicity, denoted $P_S$, and sensing duration, denoted $T_S$, of the at least one other communication station: $T_W \geq P_S + T_S$.

In this way, it can be ensured that the other communication station(s) can get access to the radio-based medium on the shared radio spectrum at some point in time when performing the LBT-based medium access procedure. This provides a systematic and deterministic approach to a more balanced medium access.

For example, the sensing periodicity may correspond to a sensing cycle period.

In a particular example, the communication station and the at least one other communication station operate according to a frame-based transmission protocol in which each frame is divided into sub-frames and sensing is allowed in each sub-frame before transmission takes place, and the communication station waits, when the communication station has transmitted, for at least one sub-frame before repeating the LBT-based medium access procedure.

By way of example, the communication station waits, when the communication station has transmitted, and performs the sensing at the end of a following sub-frame.

The method does not necessarily have to be performed each time the communication has had a transmit opportunity. As an example, the waiting step may be performed after the communication station has had the transmit opportunity N times, where N is an integer equal to or greater than 1.

As previously indicated, the proposed technology enables a more balanced and/or fair medium or channel sharing between different communication stations, belonging to the same or different networks.

By way of example, the communication station and the at least one other communication station may belong to the same radio network.

In a particular example, the communication station and the at least one other communication station belong to respective unsynchronized radio networks operating in the shared radio spectrum.

As an example, the shared radio spectrum may be an unlicensed spectrum.

For example, the shared radio spectrum may be a radio spectrum for Long Term Evolution, LTE.

In a particular example, when the communication station(s) belong to different networks, the proposed technology may enable so-called co-existence of different networks, e.g. in an unlicensed spectrum. This could for example be co-existence between different Long Term Evolution in Unlicensed spectrum, LTE-U, networks, and/or co-existence between LTE-U and WLAN such as WiFi.

As indicated, in a particular example, the waiting step enables the at least one other communication station to access the radio-based medium on the shared radio spectrum.

In an example embodiment, the communication station is a radio base station. By way of example, the communication station and the at least one other communication station are radio base stations.

In another example embodiment, the communication station is a mobile station. By way of example, the communication station and the at least one other communication station are mobile stations.

In other words, the proposed technology is applicable in a downlink scenario and/or an uplink scenario.

For a better understanding of the proposed technology, it may be useful to discuss some of the prior art solutions with respect to LBT-based medium access, and highlight some advantages of the proposed technology in a few, non-limiting examples of communication applications.

For example, in order to cope with the demand for higher network capacity in modern communication systems such as Long Term Evolution, LTE, it has been recently suggested to deploy the system in unlicensed spectrum. An operator can deploy radio base stations supporting LTE both in licensed and unlicensed spectrum. As compared to LTE/WiFi integration, this solution simplifies deployment and operating cost since a single radio access network is required. LTE in Unlicensed spectrum, abbreviated as LTE-U hereafter, requires Medium Access Control, MAC, protocols to enable coexistence with WiFi and/or other LTE-U networks belonging to other operators.

Reference [1] relates to deployment of LTE on a license-exempt band as part of the so-called pico-cell underlay. Coexistence mechanisms and other modifications to LTE are discussed. A performance analysis shows that LTE can deliver significant capacity even while sharing the spectrum with WiFi systems.

One of the MAC protocols well known in WiFi networks is Carrier Sense Multiple Access with Collision Avoidance, CSMA/CA. This is a Listen-Before-Talk, LBT, protocol in which a station listens for a carrier for a fixed listening duration and defers if it detects an on-going transmission and transmits immediately if nothing is detected. LTE-U adopts the frame structure of LTE; hence, LBT can only be done at specific times for LTE-U. Since every sub-frame is 1 ms, LBT can be done at most every 1 ms interval. By adopting LBT for LTE-U transmission, coexistence of LTE-U and WiFi can be possible.

An example of a frame-based LBT solution is presented in reference [2]. This solution operates based on a Fixed Frame Period. A frame is generally divided into two main parts, the Channel Occupancy Time and the Idle Period.

Figure 4:
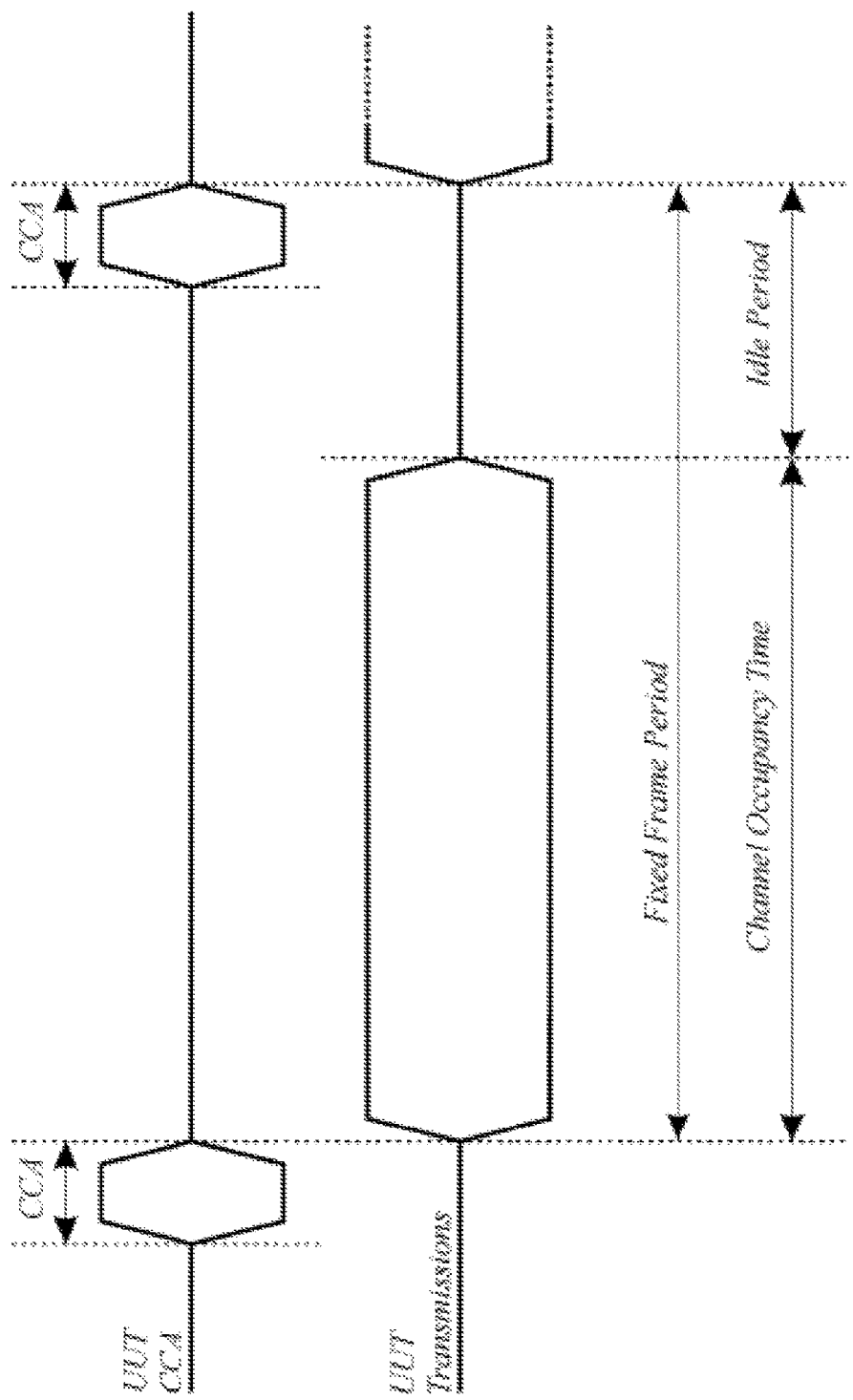
FIG. 4 is a schematic timing diagram illustrating an example of a frame-based LBT solution according to the prior art.

Transmissions are performed during the Channel Occupancy Time. Between transmissions, the station is silent for an Idle Period. At the end of the Idle Period, the station does a so-called Clear Channel Assessment, CCA, i.e. sensing the medium, before transmitting again, as illustrated in FIG. 4.

Another MAC protocol known in WiFi is LBT with random back-off. In this protocol, stations will contend by listening for a randomly picked listening duration. As a result, multiple independent stations will pick different listening durations and hence will not start transmitting at the same time.

Another mechanism that can be used for LTE-U and WIFI coexistence is discontinuous transmission (DTX). In this method, LTE-U turns off transmission periodically for a fixed duration, which can be few sub-frames or frames long. According to one of the known solutions, the idea is to turn-off a fixed pattern of sub-frames within a radio frame. These so-called blank patterns can enable WiFi to get access to the channel and enable coexistence.

Though protocols like conventional LBT and DTX can possibly enable LTE-U and WiFi coexistence, these MAC protocols are generally not enough for coexistence of multiple, independent LTE-U networks.

Operators deploying LTE in unlicensed spectrum are not obliged to cooperate or share information between their networks. For example, there will normally not be any synchronization between multi-operator LTE-U networks. This creates a big challenge to enable coexistence of these unsynchronized LTE-U networks while still enabling coexistence with WiFi. LBT and DTX cannot enable coexistence in this case. Applying a solution like the one in reference [2] with an offset in the frame timing between LTE-U systems leads to an unfairness problem. When the channel becomes free, the sensing period or CCA will always occur first for the system that has most recently used the channel. The other systems will never get the chance to grab the channel as long as the first system has more data to send. Even though operators decide to cooperate and synchronize their networks, independent transmissions from LTE-U networks will always collide when LBT is used. That means the nodes will listen and transmit at the same time. If DTX is used instead of LBT, this results in further reduction in performance due to the synchronized off durations that are not used by both networks.

For coexistence of multiple, independent LTE-U networks, a MAC protocol that can possibly be used is LBT with random back-off. This protocol is suitable for non-frame based systems like WiFi. However, it has the following problems when used for LTE-U:

LBT and LBT with random back-off are not tolerant to synchronization offset. Though LBT with random back-off gives good coexistence throughput when LTE-U networks are synchronized, performance decreases drastically when there is a synchronization offset. For example, if the synchronization offset is greater than the maximum listening duration, only one of the LTE-U networks gets the channel and the other network(s) has no chance.

LBT with random back-off is not suitable for practical implementation in LTE-U due to the frame based transmission of LTE. LTE nodes expect data transmission to begin only at sub-frame start times, which is typically every 1 ms interval. On the other hand, LBT with random back-off requires nodes to start transmission immediately after their back-off timer is elapsed. There is also a probability of collision when the two networks draw the same random listening duration.

To summarize, the conventional MAC protocols cannot enable coexistence of multiple LTE-U networks and/or are not suitable for practical implementation due to the frame structure of LTE.

At least one of the embodiments of the proposed technology provides for a MAC protocol that enables coexistence of multiple, independent, multi-operator LTE-U networks. As an example, the proposed MAC protocol may use an adaptive LBT method, in which an LTE-U network listens periodically; but, it skips the listening slot just after getting access to the channel. By skipping this listening slot, an LTE-U network, or the concerned communication station, implicitly skips one sub-frame before trying to transmit again. By doing so, it gives opportunity for another network, or the corresponding communication station thereof, with a synchronization offset to get in and grab the channel. In such a way, two or more independent LTE-U networks using the adaptive LBT protocol alternate in getting access to the channel. Besides, the proposed protocol gives enough space for a WLAN such as WiFi to access the channel; as a result, it can also allow coexistence of LTE-U and WiFi.

In this way, coexistence of multiple networks using the same frequency is enabled.

Tolerance to a synchronization offset between LTE-U networks is also enabled: In unlicensed spectrum, there is no time synchronization between LTE-U networks of different operators; it is a best effort service where everyone tries to access the channel using MAC protocols. At least one embodiment of the proposed technology enables co-existence for any synchronization offset. In fact, the method takes advantage of the presence of the synchronization offset between LTE-U networks to enable coexistence. If the networks are synchronized, a small systematic offset can be introduced to make them asynchronous.

The proposed technology is also suitable for practical implementation: As compared to the LBT with random back-off protocol, the proposed method is suitable for practical implementation.

Optionally, the proposed MAC protocol enables coexistence of uncoordinated (asynchronous) frame-based networks in unlicensed spectrum.

By way of example, the procedure involves an adaptive CSMA or LBT medium access protocol, in which a node or communication station skips one sub-frame following channel occupancy before doing LBT and occupying the channel again.

For a more in-depth understanding of the differences between the conventional MAC protocols and example embodiments of the proposed technology, reference will now be made to FIGS. 5-8.

Figure 5:
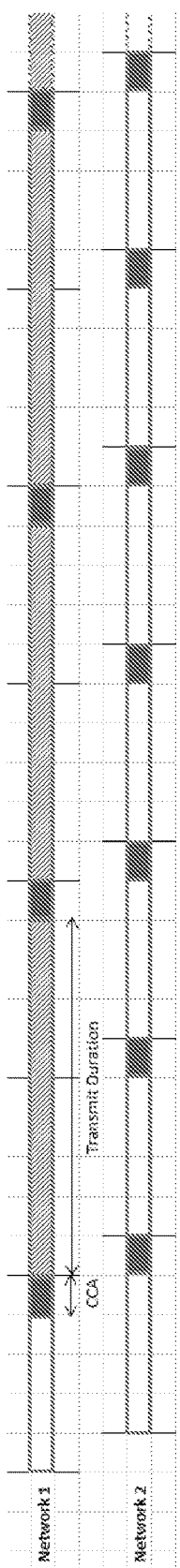
FIG. 5 is a schematic timing diagram illustrating a first example of the behavior of an LBT protocol for communication stations belonging to two different unsynchronized networks according to the prior art.

FIG. 5 is a schematic timing diagram illustrating a first example of the behavior of an LBT protocol for communication stations belonging to two different unsynchronized networks according to the prior art.

Consider two unsynchronized LTE networks operating in unlicensed spectrum. We want a MAC protocol that gives a fair channel access to both networks thus enabling coexistence.

First, consider the conventional CSMA/CA or LBT protocol. By using conventional LBT, each LTE-U network does carrier sensing every sub-frame interval, which is 1 ms in LTE. Once an LTE-U network does carrier sensing and detects nothing, it will normally occupy the channel for several sub-frames. At the end of the channel occupancy period, carrier sensing is done again to decide whether to transmit in the next sub-frames or not. If two unsynchronized LTE-U networks do the conventional LBT procedure, what happens is shown in FIG. 5.

The sub-frame start times are indicated using periodic, long vertical lines. Since there is a synchronization offset between the networks, it is assumed without loss of generality that the sub-frame start time of the first network is earlier than the second network. The dark boxes labelled "CCA" show the listening durations and the longer hatched boxes denote the channel occupancy or transmit durations. As shown in the example of FIG. 5, the first network will finish its LBT sensing period (CCA) first and gets the first transmit opportunity. As soon as it finishes transmission (before the next sub-frame starts), the first network will start listening again. As a result, the first network will get the channel again since the listening duration of the second network is yet to come. With the listening durations occurring at most at an interval of 1 sub-frame, the second network will never get the channel using this protocol.

Figure 6:
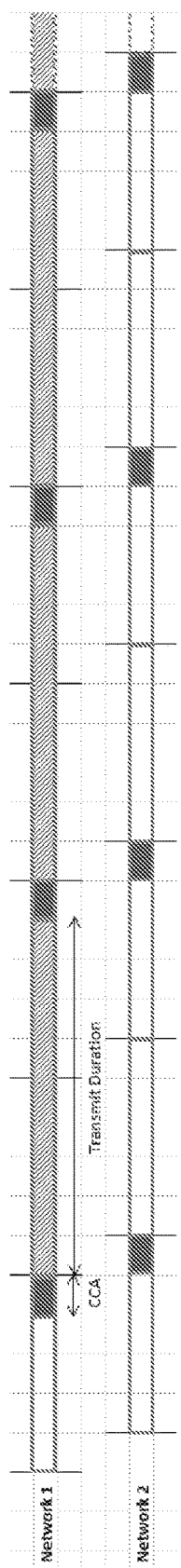
FIG. 6 is a schematic timing diagram illustrating a second example of the behavior of an LBT protocol for communication stations belonging to two different unsynchronized networks according to the prior art.

If the LBT solution according to reference [2] is used between two unsynchronized frame-based systems, the result is shown in FIG. 6. As explained earlier, this method also results in the first network getting the channel all the time and the second getting no access. Therefore, the conventional LBT protocol cannot be used to enable fair channel sharing for frame-based networks.

It may theoretically be possible to enable some form of fair channel sharing by using LBT with random back-off protocol. If the synchronization offset is small, there will be overlap between the LBT durations of network 1 and network 2, in FIG. 5. If the LBT sensing durations are random in addition, then there is a possibility for the LBT timer of network 2 to expire before that of network 1. This means that network 2 can get access to the channel. However, this works only if there is overlap between the LBT durations of the two networks which happens only if the synchronization offset is less than the maximum listening duration in the random back-off window. Therefore, LBT with random back-off enables fair sharing only if the synchronization offset is very small.

It should also be noted that even though CSMA/CA is used herein as an illustrative example of a listen-before-talk method, the various embodiments described herein may be equally applicable to any wireless communication with application of a listen-before-talk or, equivalently, sense-before-transmit principle.

In order to really enable fair channel sharing, an example embodiment of the proposed technology suggests an adaptive LBT protocol.

Figure 7:
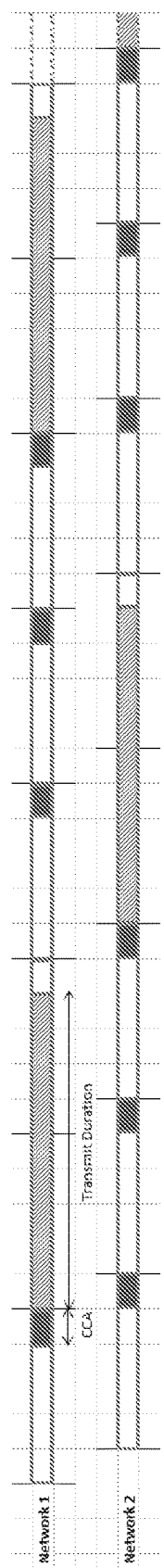
FIG. 7 is a schematic timing diagram illustrating an example of the behavior of an adaptive LBT medium access, when applied to communication stations of two unsynchronized networks, according to an embodiment.

FIG. 7 is a schematic timing diagram illustrating an example of the behavior of an adaptive LBT medium access, when applied to communication stations of two unsynchronized networks, according to an embodiment.

Adaptive LBT is an LBT protocol with the following modification: Once a network does LBT and gets access to the channel, it should skip one sub-frame of transmission before listening and transmitting again. Hence, it is not necessary to listen immediately after transmission. LBT will be performed at the end of a first sub-frame following transmission, in order to evaluate the possibility of transmitting in the second sub-frame following transmission. The result of applying this protocol to two unsynchronized LTE-U networks is shown in FIG. 7. The first network gets the first transmit opportunity, but it is not allowed to transmit in the next sub-frame, i.e. should skip the next sub-frame. This gives opportunity for the second network to do LBT and get the channel next as shown by the hatched box for network 2. Again after network 2 finishes transmission, it is required to skip the next sub-frame and this gives the transmission opportunity back to network 1, and then again back to network 2 and the sequence continues.

In a sense, adaptive LBT can be compared to a time division multiplexing system; but it can work with no or limited coordination between the networks.

Figure 8:
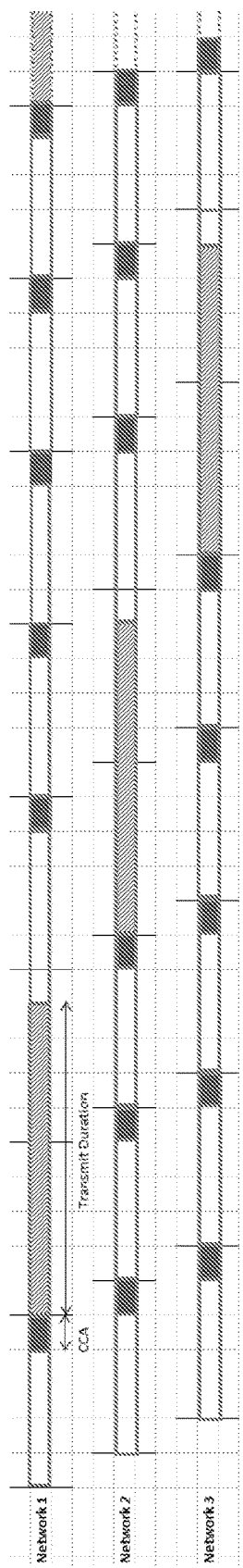
FIG. 8 is a schematic timing diagram illustrating an example of the behavior of an adaptive LBT medium access, when applied to communication stations of three unsynchronized networks, according to an embodiment.

FIG. 8 is a schematic timing diagram illustrating an example of the behavior of an adaptive LBT medium access, when applied to communication stations of three unsynchronized networks, according to an embodiment.

As long as there is a synchronization offset, adaptive LBT enables channel sharing between any number of networks. For example, FIG. 8 shows the application of adaptive LBT among three LTE-U networks. As illustrated, the protocol gives equal transmit opportunity to all three networks.

Optionally, there is a possibility to apply further adaptation to the proposed technology, as previously indicated. As stated above, the adaptive LBT method skips a sub-frame every time a LTE-U network gets transmit opportunity. Instead of doing the sub-frame skipping every time a network gets one transmit opportunity, it can be done after a network gets transmit opportunity N times, where N≥1. Then, the value of N can be adapted based on whether a carrier is detected in the previous LBT or not. For example, if there is only one LTE-U network, it will be feasible to use N much higher than 1 in order to reduce the loss of time resources due to the sub-frame skipping.

As mentioned, embodiments of the proposed technology may for example be applied for downlink and/or uplink communication. By way of example, LTE-U is currently expected primarily for the downlink access, but may be designed for both downlink and uplink. For the uplink access, UEs may for example receive their uplink grants for the unlicensed carrier via the licensed carrier, through carrier aggregation. Before transmitting in a granted sub-frame, the UE first senses the medium. If there is already an on-going transmission, the UE ignores the uplink grant and does not transmit. If there is no on-going transmission, the UE may have the opportunity to transmit. However, according to an example embodiment of the proposed technology, when the UE has transmitted, it waits for a waiting duration that is based on a time duration between consecutive sensing occasions for at least one other UE, also operating according to an LBT-based medium access procedure on the shared radio spectrum, before performing the LBT-based medium access procedure again.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to a second aspect, there is provided a communication station configured for Listen-Before-Talk, LBT, based medium access. The communication station is configured to perform an LBT-based medium access procedure including:

sensing a radio-based medium on a shared radio spectrum during a sensing duration;

deferring transmission if an on-going transmission is detected during said sensing; and transmitting on the radio-based medium if no on-going transmission is detected during said sensing.

The communication station is further configured to wait, when the communication station has transmitted, for a waiting duration that is based on a time duration between consecutive sensing occasions for at least one other communication station, also operating according to an LBT-based medium access procedure on the shared radio spectrum, before performing the LBT-based medium access procedure again.

In other words, when the communication station has had a transmit opportunity and transmitted data on the radio-based medium, the communication station is configured to repeat the LBT-based medium access procedure only after the waiting duration has expired.

In an optional embodiment, the communication station is configured to wait for a waiting duration that is based on the sensing periodicity and sensing duration of said at least one other communication station, wherein the time duration between consecutive sensing occasions corresponds to the sensing periodicity of said at least one other communication station.

As an example, the communication station is configured to wait for a waiting duration, denoted $T_W$, that is equal to or greater than the sum of the sensing periodicity, denoted $P_S$, and sensing duration, denoted $T_S$, of the at least one other communication station: $T_W \geq P_S + T_S$.

In a particular example, the communication station is configured to operate according to a frame-based transmission protocol in which each frame is divided into sub-frames and sensing is allowed in each sub-frame before transmission takes place, and the communication station is configured to wait, when the communication station has transmitted, for at least one sub-frame before repeating the LBT-based medium access procedure.

Optionally, the communication station is configured to wait, when the communication station has transmitted, to perform the sensing at the end of a following sub-frame.

As an example, the communication station may be configured to wait, when the communication station has had the transmit opportunity N times, for the waiting duration before performing the LBT-based medium access procedure, where N is an integer equal to or greater than 1.

According to a first application example, the communication station belongs to the same radio network as the at least one other communication station.

According to a second application example, the communication station belongs to a different and unsynchronized network relative to the network(s) of the at least one other communication station.

By way of example, the shared radio spectrum may be an unlicensed spectrum.

For example, the shared radio spectrum may be a radio spectrum for Long Term Evolution, LTE.

In a particular example, when the communication station(s) belong to different networks, the proposed technology may enable so-called co-existence of different networks, e.g. in an unlicensed spectrum. This could for example be co-existence between different Long Term Evolution in Unlicensed spectrum, LTE-U, networks, and/or co-existence between LTE-U and WLAN such as WiFi.

As indicated, in a particular example, the controlled waiting enables the at least one other communication station to access the radio-based medium on the shared radio spectrum.

In an example embodiment, the communication station is a radio base station.

In another example embodiment, the communication station is a mobile station.

Figure 9:
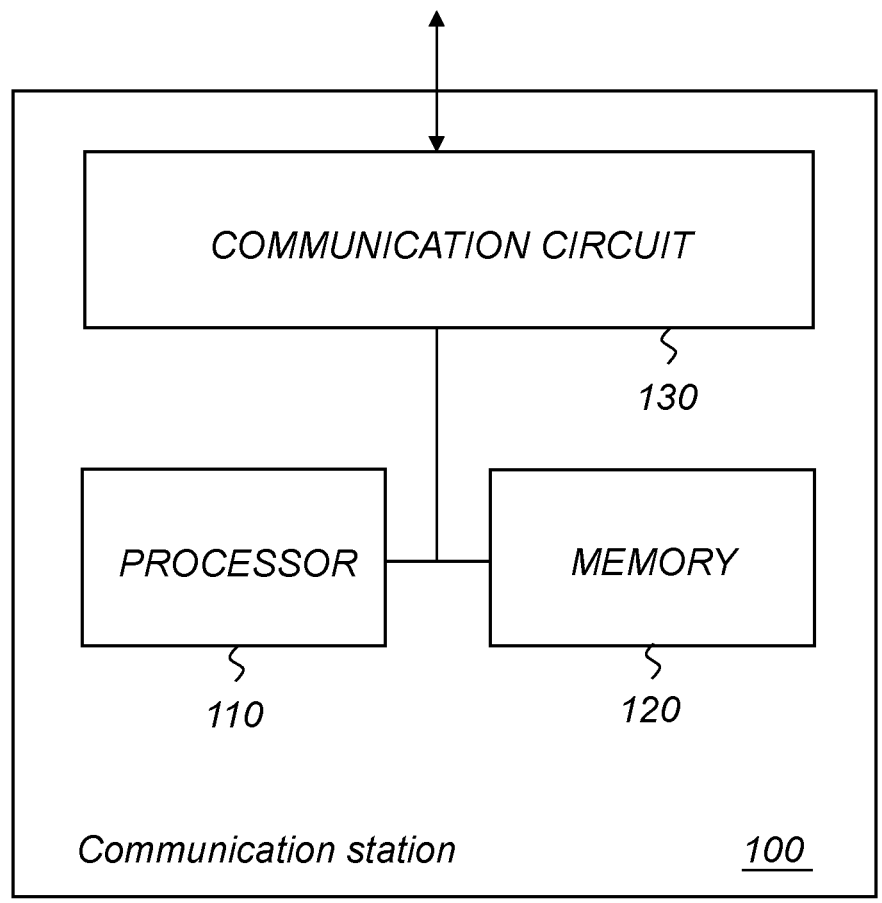
FIG. 9 is a schematic diagram illustrating an example of a communication station according to an embodiment.

FIG. 9 is a schematic diagram illustrating an example of a communication station according to an embodiment.

In this particular example, the communication station 100 comprises a processor 110 and a memory 120. The memory 120 comprises instructions executable by the processor 110, whereby the processor 110 is operative to assist in performing the LBT-based medium access procedure and to enable the communication station to wait, when the communication station has transmitted, for the waiting duration before performing the LBT-based medium access procedure again.

Optionally, the communication station 100 comprises a communication circuit 130 configured to sense the radio-based medium during a sensing duration and to transmit on the radio-based medium if no on-going transmission is detected during sensing. The communication circuit 130 may be interconnected to the processor 110 and/or memory 120.

Figure 10:
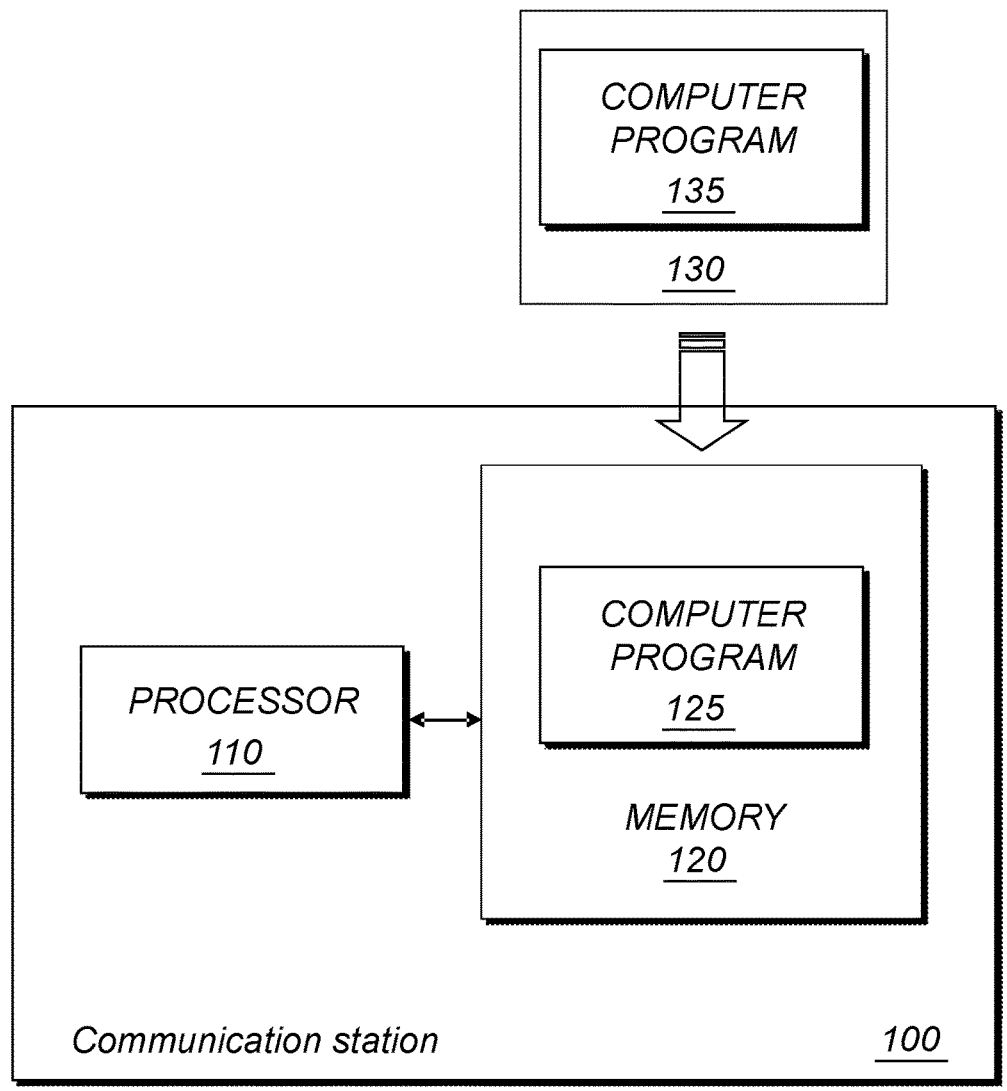
FIG. 10 is a schematic diagram illustrating an example of a communication station according to another embodiment.

FIG. 10 is a schematic diagram illustrating an example of a communication station according to another embodiment.

In this particular example, at least some of the steps, functions, procedures, modules and/or blocks described herein are implemented in a computer program 125; 135, which is loaded into the memory 120 for execution by processing circuitry including one or more processors 110. The processor(s) 110 and memory 120 are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

According to a third aspect, there is provided a computer program 125; 135 comprising instructions, which when executed by at least one processor 110, cause the at least one processor 110 to:

control a Listen-Before-Talk, LBT, based medium access procedure in which a radio-based medium is sensed on a shared radio spectrum during a sensing duration and a transmit opportunity on the radio-based medium is given to a communication station if no on-going transmission is detected during the sensing; and enable the communication station to wait, when the communication station has transmitted in the given transmit opportunity, for a waiting duration that is based on a time duration between consecutive sensing occasions for at least one other communication station, also operating according to an LBT-based medium access procedure on the shared radio spectrum, before performing the LBT-based medium access procedure again.

According to a fourth aspect, the proposed technology also provides a carrier 120; 130 comprising the computer program 125; 135, wherein the carrier is one of an electronic signal, an optical signal, an electromagnetic signal, a magnetic signal, an electric signal, a radio signal, a microwave signal, or a computer-readable storage medium.

By way of example, the software or computer program 125; 135 may be realized as a computer program product, which is normally carried or stored on a computer-readable medium 120; 130, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may also be regarded as a computer flow diagram or diagrams, when performed by one or more processors. A corresponding communication station may therefore be defined as a group of function modules, where each step performed by the processor corresponds to a function module. In this case, the function modules are implemented as a computer program running on the processor. Hence, the communication station may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein.

Figure 11:
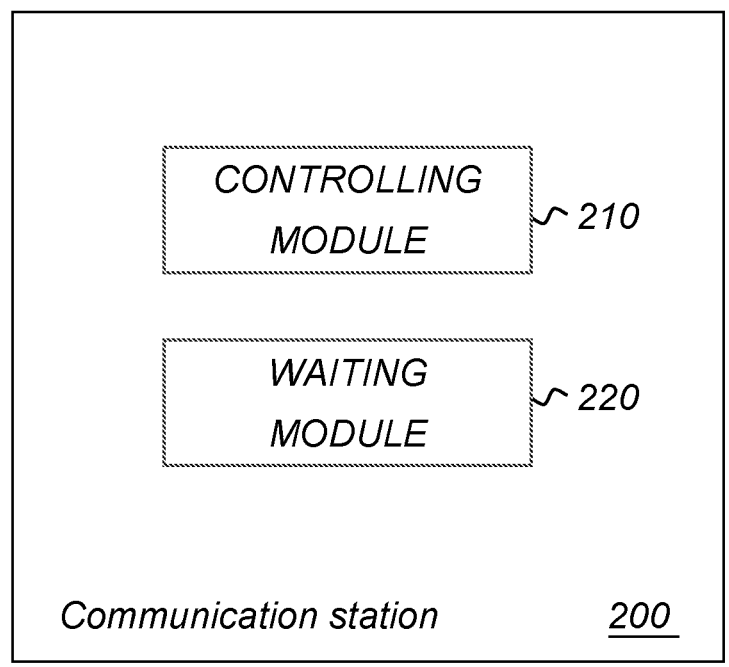
FIG. 11 is a schematic diagram illustrating an example of a communication station according to yet another embodiment.

FIG. 11 is a schematic block diagram illustrating an example of a communication station comprising a group of function modules.

According to a fifth aspect, there is provided a communication station 200 for performing Listen-Before-Talk, LBT, based medium access. The communication station 200 comprises a controlling module 210 and a waiting module 220.

The controlling module 210 is adapted for controlling an LBT-based medium access procedure in which a radio-based medium is sensed on a shared radio spectrum during a sensing duration and a transmit opportunity on the radio-based medium is given to a communication station if no on-going transmission is detected during the sensing.

The waiting module 220, which is also referred to as an enabling module, si adapted for enabling the communication station to wait, when the communication station has transmitted in the given transmit opportunity, for a waiting duration that is based on a time duration between consecutive sensing occasions for at least one other communication station, also operating according to an LBT-based medium access procedure on the shared radio spectrum, before performing the LBT-based medium access procedure again.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] *License-Exempt LTE Deployment in Heterogeneous Network*, Ratasuk et. al, International Symposium on Wireless Communication Systems, 2012.

[2] ETSI EN 301 893, V1.7.0, 2012-01, *Broadband Radio Access Networks (BRAN); 5 GHz high performance RLAN; Harmonized EN covering the essential requirements of article 3.2 of the R&TTE Directive.*

The invention claimed is:

1. A method, performed by a communication station, for Listen-Before-Talk (LBT)-based medium access, wherein said method comprises the steps of:

performing an LBT-based medium access procedure including:

sensing a radio-based medium on a shared radio spectrum during a sensing duration, denoted $T_S$;

deferring transmission if an on-going transmission is detected during said sensing;

transmitting on the radio-based medium if no on-going transmission is detected during said sensing; and waiting, when the communication station has transmitted, for a waiting duration, denoted $T_W$, that is based on a time duration between consecutive sensing occasions for at least one other communication station, also operating according to the LBT-based medium access procedure on the shared radio spectrum, before performing the LBT-based medium access procedure again, wherein the time duration corresponds to a sensing periodicity, denoted $P_S$, of said at least one communication station, and wherein the waiting duration is equal to or greater than a sum of the sensing periodicity and the sensing duration of said at least one other communication station: $T_W \geq P_S + T_S$.

2. The method of claim 1, wherein said communication station and said at least one other communication station operate according to a frame-based transmission protocol in which each frame is divided into sub-frames and sensing is allowed in each sub-frame before transmission takes place, and said communication station waits, when the communication station has transmitted, for at least one sub-frame before repeating the LBT-based medium access procedure.

3. A communication station configured for Listen-Before-Talk (LBT)-based medium access, wherein the communication station is configured to perform an LBT-based medium access procedure including:

sensing a radio-based medium on a shared radio spectrum during a sensing duration, denoted $T_S$;

deferring transmission if an on-going transmission is detected during said sensing; and transmitting on the radio-based medium if no on-going transmission is detected during said sensing, wherein the communication station is configured to wait, when the communication station has transmitted, for a waiting duration, denoted $T_W$, that is based on a time duration between consecutive sensing occasions for at least one other communication station, also operating according to the LBT-based medium access procedure on the shared radio spectrum, before performing the LBT-based medium access procedure again, wherein the time duration corresponds to a sensing periodicity, denoted $P_S$, of said at least one other communication station, and wherein the waiting duration is equal to or greater than a sum of the sensing periodicity and the sensing duration of said at least one other communication station: $T_W \geq P_S + T_S$.

4. The communication station of claim 3, wherein the communication station is configured to operate according to a frame-based transmission protocol in which each frame is divided into sub-frames and sensing is allowed in each sub-frame before transmission takes place, and said communication station is configured to wait, when the communication station has transmitted, for at least one sub-frame before repeating the LBT-based medium access procedure.

5. The communication station of claim 3, wherein the communication station is a radio base station.

6. The communication station of claim 3, wherein the communication station is a mobile station.

7. The communication station of claim 3, wherein the communication station comprises a processor and a memory, said memory comprising instructions executable by the processor, whereby the processor is operative to assist in performing the LBT-based medium access procedure and to enable the communication station to wait, when the communication station has transmitted, for said waiting duration before performing the LBT-based medium access procedure again.

8. The communication station of claim 3, wherein the communication station comprises a communication circuit configured to sense the radio-based medium during the sensing duration and to transmit on the radio-based medium if no on-going transmission is detected during said sensing.

9. A non-transitory computer-readable medium comprising, stored thereupon, a computer program comprising instructions that, when executed by at least one processor, cause the at least one processor to:

control a Listen-Before-Talk (LBT)-based medium access procedure in which a radio-based medium is sensed on a shared radio spectrum during a sensing duration, denoted $T_S$, and a transmit opportunity on the radio-based medium is given to a communication station if no on-going transmission is detected during said sensing; and enable the communication station to wait, when the communication station has transmitted in the given transmit opportunity, for a waiting duration, denoted $T_W$, that is based on a time duration between consecutive sensing occasions for at least one other communication station, also operating according to the LBT-based medium access procedure on the shared radio spectrum, before performing the LBT-based medium access procedure again, wherein the time duration corresponds to a sensing periodicity, denoted $P_S$, of said at least one other communication station, and wherein the waiting duration is equal to or greater than a sum of the sensing periodicity and the sensing duration of said at least one other communication station: $T_W \geq P_S + T_S$.

* * * * *